(12) United States Patent
Adnan et al.

(10) Patent No.: US 11,037,081 B1
(45) Date of Patent: Jun. 15, 2021

(54) DYNAMIC NODE LEVEL STORAGE CAPACITY MANAGEMENT SYSTEM

(71) Applicant: Amazon Technologies, Inc., Seattle, WA (US)

(72) Inventors: Mohammad Adnan, Ambedkar Nagar (IN); Manoj Tharwani, Karnataka (IN); Biswajit Mishra, Bhubaneswar (IN)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 16/190,472

(22) Filed: Nov. 14, 2018

(51) Int. Cl.
*G06Q 10/06* (2012.01)
*G06Q 30/02* (2012.01)

(52) U.S. Cl.
CPC ... *G06Q 10/06315* (2013.01); *G06Q 30/0202* (2013.01)

(58) Field of Classification Search
None
See application file for complete search history.

(56) References Cited

U.S. PATENT DOCUMENTS

| | | |
|---|---|---|
| 8,280,547 B2 | 10/2012 | D'Andrea et al. |
| 9,619,817 B1 * | 4/2017 | Forester ............. G06Q 30/0223 |
| 2004/0054625 A1 * | 3/2004 | Kellogg ............... G06Q 20/102 705/41 |
| 2008/0301009 A1 * | 12/2008 | Plaster ................. G06Q 10/087 705/28 |
| 2011/0004509 A1 * | 1/2011 | Wu ................... G06Q 10/06375 705/7.37 |
| 2012/0143427 A1 | 6/2012 | Hoffman et al. |
| 2014/0067467 A1 * | 3/2014 | Rangarajan ............ G06Q 30/02 705/7.31 |
| 2014/0257928 A1 * | 9/2014 | Chen .................. G06Q 30/0202 705/7.31 |
| 2017/0323250 A1 * | 11/2017 | Lindbo ............ G06Q 10/08345 |
| 2020/0065745 A1 * | 2/2020 | Engel .................... G06Q 10/087 |
| 2020/0111109 A1 * | 4/2020 | Lei ............................ G06N 3/08 |
| 2020/0118061 A1 * | 4/2020 | Jain .................. G06Q 10/08355 |

* cited by examiner

*Primary Examiner* — Jamie H Austin
(74) *Attorney, Agent, or Firm* — Kilpatrick Townsend & Stockton LLP

(57) ABSTRACT

Techniques for dynamically allocating storage space at fulfillment centers for sellers offering items are disclosed herein. In embodiments, information about available bins of a fulfillment center for storing inventory may be obtained. Sales performance factor information for a seller offering items may be received for items that are being stored at a fulfillment center. A capacity of bin numbers and bin sizes may be determined for the seller based on the sales performance factor information and the number of available bins. A threshold space assignment for the seller may be determined based on an inventory group associated with the offered items associated with the seller. Particular bin sizes and bin numbers may be identified at the fulfillment center for the particular seller to store the offered items based on the capacity and threshold space assignment.

19 Claims, 8 Drawing Sheets

DYNAMIC NODE LEVEL STORAGE CAPACITY MANAGEMENT SYSTEM

BACKGROUND

Modern inventory systems, such as those in mail order warehouses, supply chain distribution centers, airport luggage systems, and custom-order manufacturing facilities, face significant challenges in responding to requests for inventory items as well as allocating space for sellers to store inventory. For example, conventional inventory systems may statically allocate storage space and corresponding inventory bins for use by a set number of sellers to store their inventory. However, some sellers may offer fewer items than others thereby not optimally using the allocated space whereas other sellers may be offering many items successfully such that their business has grown and require more storage space. Conventional inventory systems that utilize static storage allocation mechanisms may unnecessarily store one sellers inventory across multiple locations resulting in slower order fulfillment time as the allocated space for the seller is fully used with no avenues to reconfigure to adjust the amount of space for sellers based on a number of factors.

BRIEF DESCRIPTION OF THE DRAWINGS

Various embodiments in accordance with the present disclosure will be described with reference to the drawings, in which.

DETAILED DESCRIPTION

Figure 1:
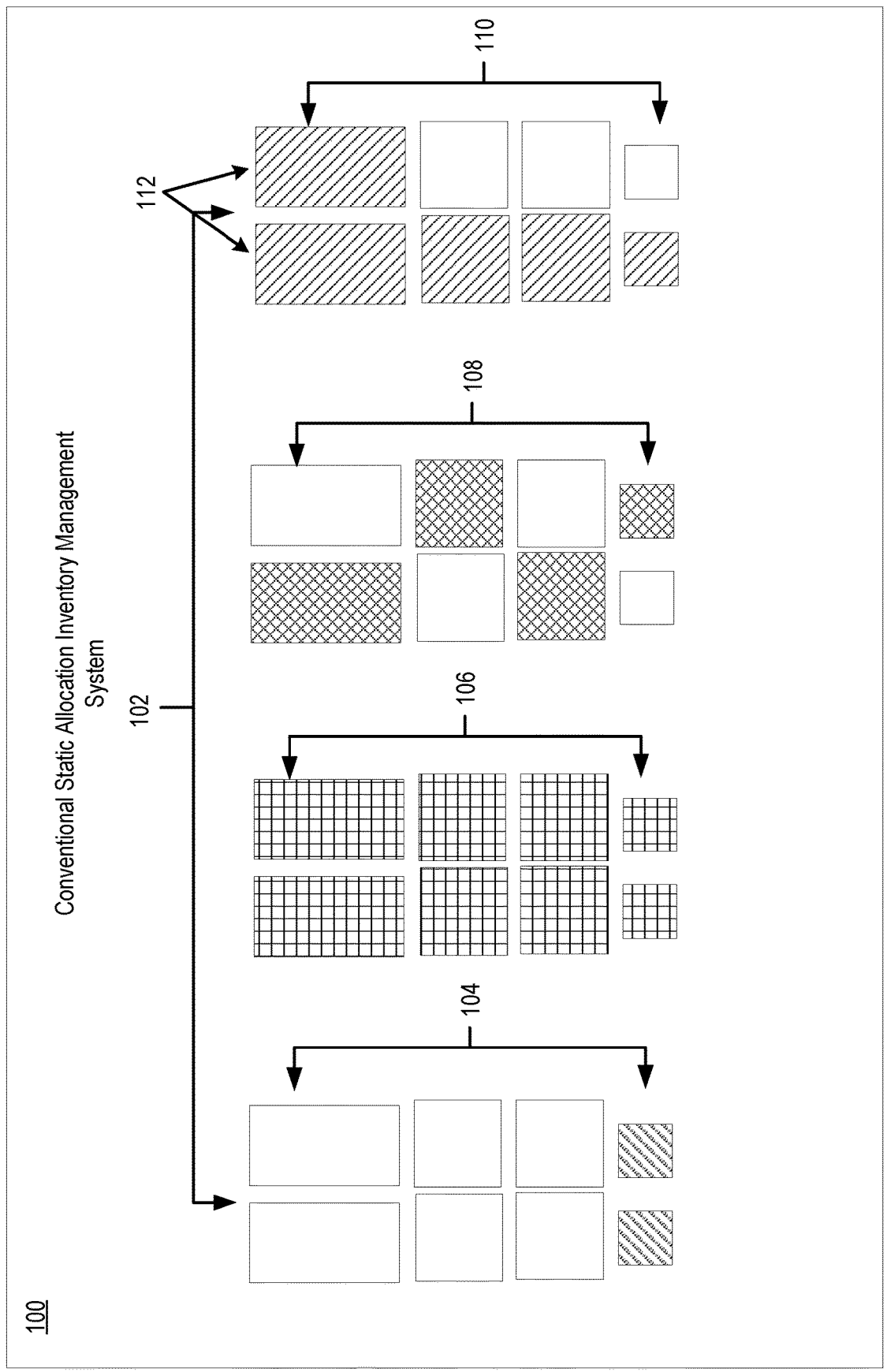
FIG. 1 depicts an example of a conventional static allocation inventory management system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for an allocation feature that dynamically determines storage space (e.g., bins) within a fulfillment center to allocate or designate for a seller offering items. In embodiments, a service provider computer and/or inventory management computer implementing the allocation feature may utilize seller metrics and information about available storage space within a fulfillment center to determine and allocate a portion of available bins of various sizes to each seller offering items that are also stored in fulfillment centers prior to the order for the item. A fulfillment center may include a workspace, a facility, a storage center, or any suitable space for facilitating the entry, processing, storage, and/or removal of inventory items (items) from bins or inventory holders. The items may be temporarily stored in the fulfillment center on behalf of third party sellers who offer items in an electronic marketplace that is associated with the fulfillment center. The allocation feature described herein may periodically adjust the storage capacity assigned to sellers based on the seller's metrics including a seller's actual sales performance (within a certain previous time period such as the previous eight weeks), forward looking regional customer demand projections, type and amount of inventory that a seller is offering, a seller's growth potential, and utilization of current allocated space. Embodiments described herein may provide sellers adequate capacity to grow their business while reducing storage costs for an inventory management system and sellers who do not fully utilize the current allocated storage space. The allocation feature may dynamically and automatically adjust the allocated storage space for sellers such that the seller is not required to make requests or demands to obtain more or less space.

Inventory management systems may have limited storage capacity for sellers which can be adjusted utilizing the allocation feature described herein to increase storage capacity for some sellers while reducing storage capacity for other sellers. In embodiments, information identifying geographic demand for certain items that are offered by sellers may be utilized to assign certain storage capacity within a geographically close fulfillment center that correspond to the geographic demand. The allocation feature may provide information for presenting, via a user interface of a user device, the details of the allocated space for review by sellers. In accordance with at least one embodiment, the allocation feature may utilize demand requests from sellers as a data point in determining the space allocation for a given seller. In accordance with at least one embodiment, the allocation feature includes an algorithm that uses the seller metrics and storage space available in a fulfillment center as well as other factors to determine the appropriate storage space that should be allocated per seller. A bin may include an inventory holder or a detachable component of an inventory holder that is configured to store one or more inventory items or an inventory item itself. A detachable component of the inventory holder can include a tray, a tote, a box, a segment, a component, or any suitable storage unit that is configured to accommodate one or more inventory items. Fulfillment centers may include one or more bins and or pallets that are configured to store inventory and be transported by a mobile ground unit or human throughout the fulfillment center to complete an inventory transfer operation (e.g., move the item from one location to another location within the fulfillment center) or an order completion operation (e.g., prepare the item for shipping to a consumer's location).

In accordance with at least one embodiment the seller's metrics may include sales performance factor information, forecast factor information, seller selection factor information, and strategic reserve space factor information. Sales performance factor information may identify a number of inventory units (bin numbers of bin sizes) to be assigned to a seller based at least in part on the seller's sales performance (past sales performance) within a certain time period (e.g., previous eight weeks) in an unconstrained environment, with no consideration of actual physical space available in a fulfilment center as well as a seasonality factor information. The sales performance factor information may identify an item sales rate or item sales velocity of item sales made by a seller. The seasonality factor information that identifies a period of increased activity that corresponds to certain calendar seasons with respect to certain geographical regions. The seasonality factor information can be determined based at least in part on historical demand for certain items as depicted by a sales curve during a certain time period for a region. In embodiments, the sales performance factor information may weight or apply different weights to orders or sales completed during a more recent time period than a further time period (e.g., a higher weight factor is applied to a current week's data as opposed to data from orders or sales of three weeks ago).

The forecast factor information may identify a nationwide forecasted demand based allocation for sellers with regard to a sellers capacity to adjust to projected demand for a future time period based on historical demand patterns for the items offered by the seller. In embodiments, the forecast factor information may reduce fulfillment cost for customer orders from specific fulfillment centers with respect to regional customer demand versus national customer demand. The forecast factor information may be used to reduce the fulfillment cost and fulfillment time for fulfilling orders by placing inventory closer to a demand location in advance of orders from the demand location. Seller selection factor information may identify a subsidized or minimum allowed storage capacity in a fulfillment center based on the items or inventory offered by a seller. The subsidized or minimum allowed storage capacity may vary based on an item category or inventory group associated with an item. For example, larger inventory items such as flat screen televisions may have less minimum allowed storage than smaller inventory items, such as pens. In embodiments, the seller selection factor information may be utilized to aid a seller in growing their business as they require space to store more inventory items to see an impact in sales and drive traffic for their marketplace. In accordance with at least one embodiment, the minimum allowed storage capacity for a seller is capped based at least in part on upon market place level average sales data such as number of units required per item category following a certain time period. The strategic reserve space factor information may identify additional storage capacity for merchants offering items associated with a promotion by the merchant, manufacturer of the item, or the associated electronic marketplace. The strategic reserve space factor information may modify the sales performance factor information and the forecast factor information for a seller offering items included in the promotion. In embodiments, the strategic reserve space factor information may be limited by the capacity requested by all sellers of a given fulfillment center.

In accordance with at least one embodiment, the bin number and bin sizes or the available bins or storage space for a fulfillment center includes determining an optimal physical bin size or dimensions for any item for each fulfillment center of the fulfillment centers implementing the allocation feature described herein. For example, the design of bins and the available sizes may be different among the fulfillment centers. The allocation feature may map items to particular bin sizes according to the dimensions of the item and the dimensions of the bin for a fulfillment center. The allocation feature may map items with dimensions that are smaller than a given bin size for multiple bin sizes. For example, a pen item may be able to be stored in a small, medium, or large sized bin whereas a desktop computer may only be able to be stored in a large bin or a pallet. In accordance with at least one embodiment, the allocation feature may map items within similar inventory groups or item groups to similar bin sizes based on an assumption that the items share similar dimensions. Inventory group is determined based at least in part on a size, type, and weight of an item. In embodiments, an inventory group can be assigned by an administrator of the electronic marketplace or inventory management system. In embodiments, each inventory group may have similar bin types but different items. Inventory groups may include one or more groups such as sortable items, items that can be sorted, and non-sortable items, items that cannot be sorted such as heavy or bulky items. In embodiments, based on a volume of a bin it can have storage capacity to be associated with and store multiple units of a product or item.

In accordance with at least one embodiment, the allocation feature includes an algorithm that uses the seller metrics as well as information about available storage capacity for one or more fulfillment centers to determine and allocate storage space for each seller. The algorithm may utilize several constraints or operations which modify the seller metrics and information about available storage capacity to dynamically allocate the appropriate amount of storage space in a fulfillment center. In embodiments, the algorithm may determine a first capacity of bin numbers and bin sizes that correlates to an optimal storage capacity for each seller based at least in part on the sales performance factor information, the forecast factor information, and the seller selection factor information. The algorithm may apply differential weights to each of the three factors based at least in part on linear regression between historical predictions for each factor and actual data points for each factor. The algorithm may further modify the data points included in the sales performance factor information, the forecast factor information, and the seller selection factor information by applying a training input factor that is derived from historical trend information associated with each data point. The algorithm may determine a second capacity of bin numbers and bin sizes that utilizes sales performance factor information, the forecast factor information, the seller selection factor information, and the strategic reserve space factor information with regard to the actual physical space constraints for each fulfillment centers. If the determined second capacity for a seller is greater than the actual available space for a fulfillment center, than the allocated space for the seller may be throttled in proportion to other sellers who are competing for selections of similar bin numbers and sizes.

The algorithm may identify a least threshold space assignment (threshold space assignment) for sellers at an inventory group level for minimum inbound shipment size determinations for sellers while also taking into account of the potential risk factor of overutilization by non-performing sellers. The threshold space assignment may vary at an inventory group level and not at a bin level and may be calculated based on required inventory units for an item for a full truck load capacity. The inventory group to predictive bin type distribution of the threshold space assignment may be based at least in part on the current utilization of bin types of the seller in a fulfillment center. The algorithm may optimize the threshold space assignment based at least in part on the first capacity, the second capacity, and the threshold space assignment to identify particular bin sizes and bin numbers to allocate to each seller for a fulfillment center. The optimizing of the threshold space assignment may also utilize the optimal physical bin size or dimensions for any item for each fulfillment center (final available storage space for a fulfillment center). The algorithm may assign the threshold storage space to non-performing sellers and distribute the rest of the unutilized storage space among the other sellers based on each seller's metrics and the available storage capacity for each fulfillment center. The allocation feature implemented by the service provider computers or inventory management computers may present information, via a user interface, that identifies the allocated storage space for a seller upon request from the seller. The algorithm implementing the allocation feature may be modified by demand requests from particular sellers to account for sellers who desire to offer more inventory and pay the increased inventory storage costs or for sellers who desire to pay less for unutilized storage space that is already allocated to them in a fulfillment center.

The processes and systems described herein may be an improvement on conventional inventory management systems and in particular conventional allocation of storage space in an inventory management system. For example, conventional allocation systems for an inventory space may utilize static allocation algorithms that apply a default allocation space for each seller regardless of their performance or transfer of inventory due to orders as well as their utilization of the space itself. This can lead to sellers who need more space having to store their inventory at other locations that may increase order completion time by increasing the delivery time as well as increased costs for storing inventory across multiple fulfillment centers. Other sellers may suffer from conventional storage allocation mechanisms as they are forced to pay for inventory storage space that they never intend to utilize thereby paying for an increased overhead. The methods and systems described herein provide for more efficient and appropriate determination of storage allocation space for sellers that take into account the seller's performance, the seller's needs, promotions associated with items carried by the seller, geographical demand for certain inventory with respect to locations of fulfillment centers, and physical dimension constraints of fulfillment centers to identify the appropriate amount of storage space to allocate for each seller. Moreover, the allocation feature described herein is performed periodically thereby updating based on new data obtained by the inventory management computers or the service provider computers such that storage allocation is up to date with the demands and needs of the sellers and the consumers.

FIG. 1 depicts a conventional static allocation inventory management system. FIG. 1 includes workspace 100 that includes several bins or inventory holders 102. The workspace 100 may include all or part of a floor of a mail-order warehouse or storage facility for storing and transferring inventory. In embodiments, the bins or inventory holders are capable of being carried, rolled, and/or otherwise moved by mobile drive units and/or humans. Several bins or inventory holders 102 may be assigned to a particular seller thereby identifying an allocated storage space for each seller 104, 106, 108, and 110 (as illustrated by the different gradients associated with each inventory bin). As is depicted in FIG. 1, the storage space allocated for seller 104 is being minimally utilized with only two inventory bins being utilized whereas seller 106 is at maximum capacity and potentially requiring even more storage space. Sellers 108 and 110 may be adequately utilizing their storage space or require more of a certain type of storage space as illustrated with seller 110 utilizing the larger pallet sized 112 storage already allocated.

In conventional static allocation inventory management systems, the sellers may require more or less space which may require requests by the sellers and take an inordinate amount of time to implement. Further, without taking into account seller metrics or available storage space information for fulfillment centers, solutions may be generated that only cause further problems such as by allocating too much space to one seller or completely removing allocated space for another seller.

Figure 2:
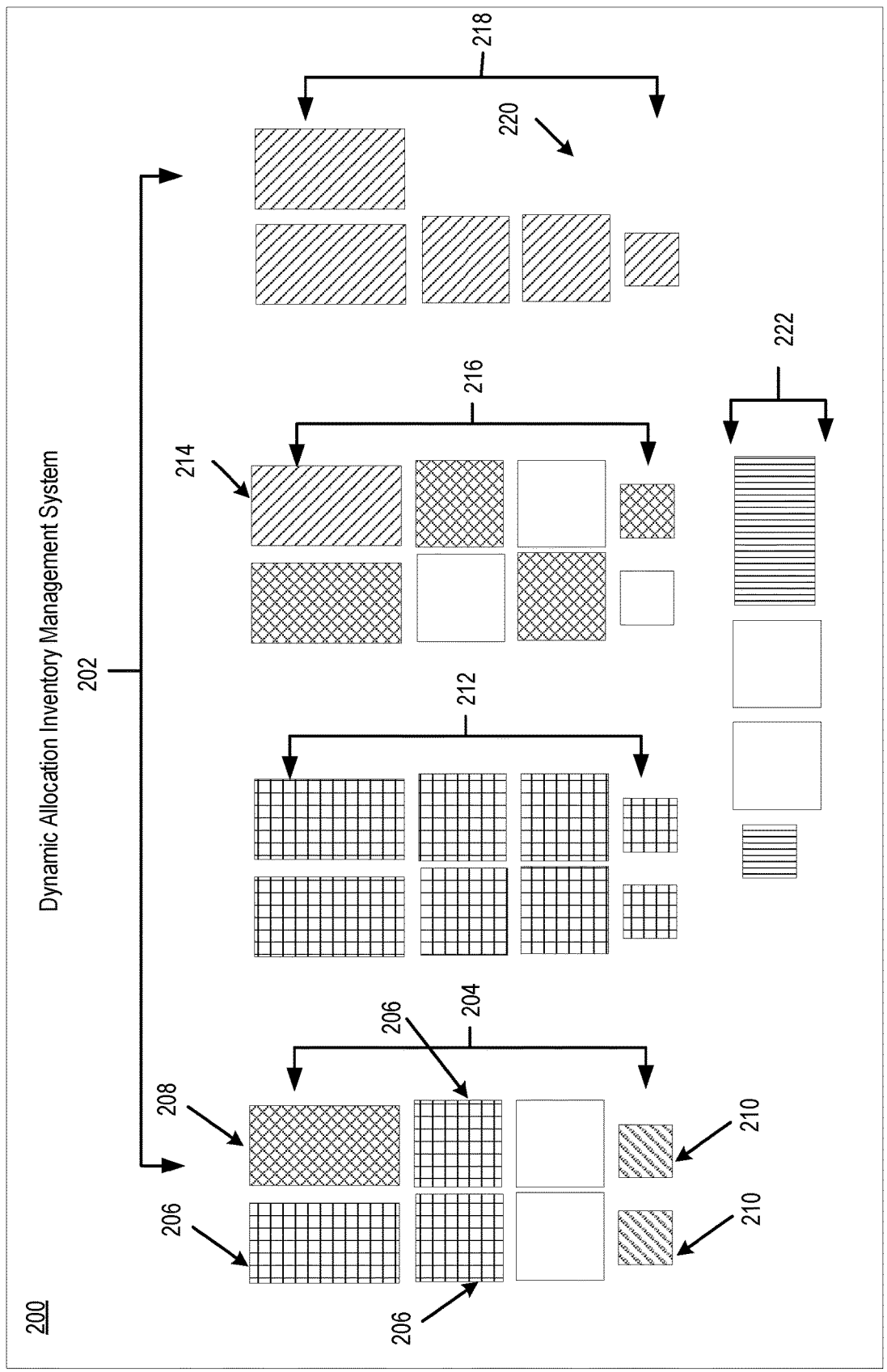
FIG. 2 depicts an example dynamic allocation inventory management system implementing an allocation feature, in accordance with at least one embodiment.

FIG. 2 depicts a dynamic allocation inventory management system implementing an allocation feature, in accordance with at least one embodiment. FIG. 2 includes workspace 200 that is similar to workspace 100 as well as bins or inventory holders 202 that are adjusted based on the allocation features described herein and more optimally utilized than the allocation mechanisms depicted in FIG. 1. As depicted in FIG. 2, the workspace includes storage space (bins) that have been allocated to different sellers based on the allocation features described herein. For example, at 204, the bins that were previously allocated for seller 104 now include inventory and allocated storage space for seller 106 at 206, seller 108 at 208, while still maintaining allocation space for seller 104 at 210. The storage space previously allocated for seller 106 remains unchanged at 212 in workspace 200 based on the seller metrics and other data points described herein for seller 106. In embodiments, the allocation feature may assign particular bin types or sizes based on the seller's metrics and available storage space information such that seller 110 may utilize a large pallet size storage 214 at 216 in response to seller 110 requiring storage of a particular bin size. At 218 the previous bins that were not being utilized 220 by seller 110 have been transferred to another area or portion of workspace 200 to generate a new storage area and capacity for new seller at 222. As illustrated in FIG. 2, the allocation feature described herein may utilize the seller metrics and available storage capacity information in an algorithm to identify an optimal storage capacity for each seller offering inventory that is stored in a fulfillment center that may include increasing, decreasing, or transferring inventory within and among different fulfillment centers to more efficiently utilize the storage space of the fulfillment center while reducing storage costs for the fulfillment center and certain sellers.

Figure 3:
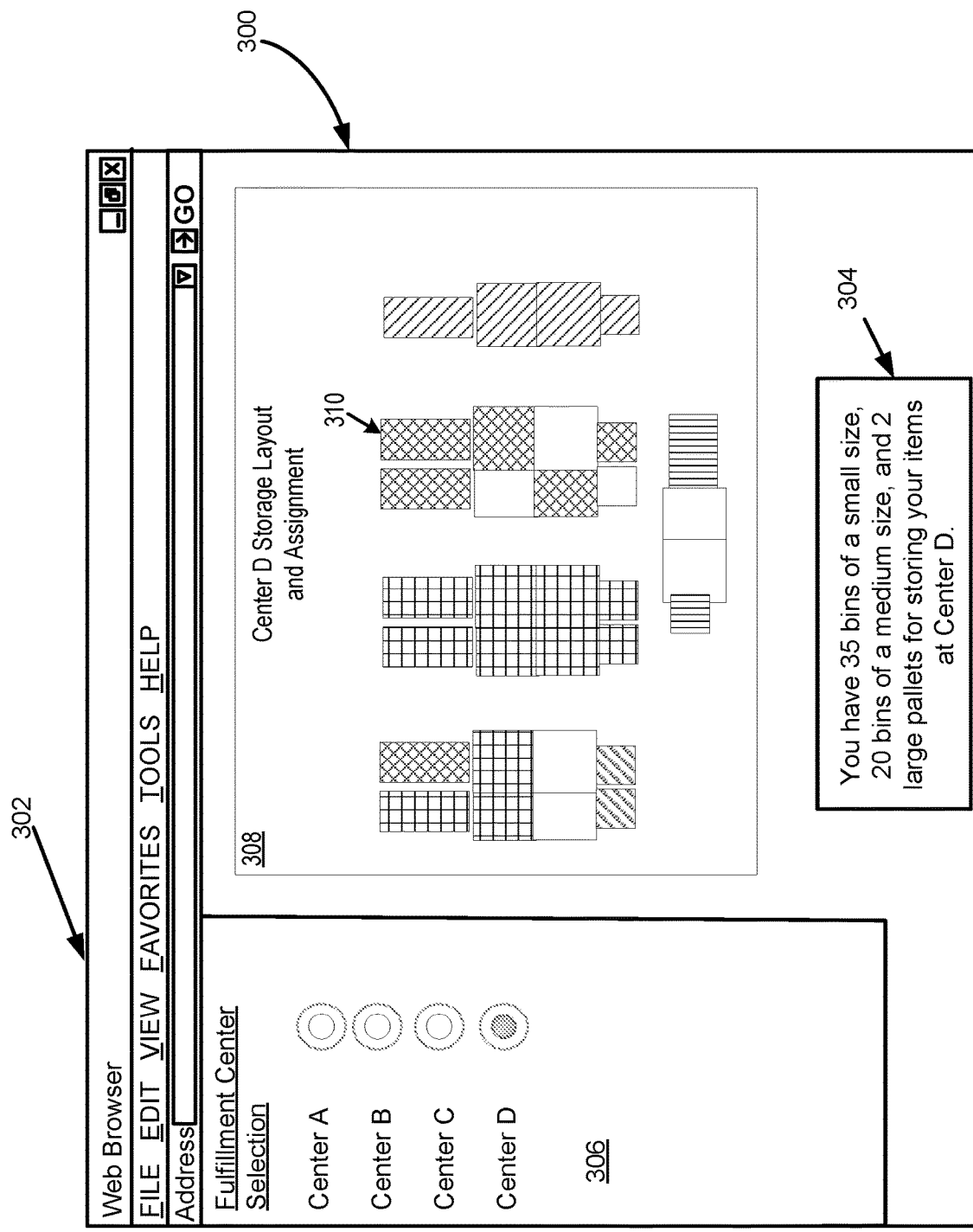
FIG. 3 depicts an example user interface presenting information associated with an allocation feature, in accordance with at least one embodiment.

FIG. 3 depicts a user interface presenting information associated with an allocation feature, in accordance with at least one embodiment. In FIG. 3, the user interface 300 may be presented via a web browser or browser application 302 and include information about allocated space for a seller at 304. The user interface 300 may include interface objects to select a particular fulfillment center at 306 which is displayed at 308 and indicated by 310. The display at 308 and indication at 310 may be described at 304. Although not pictured, a seller or user may interact with the user interface 300 to request additional storage allocation at a particular fulfillment center or request less storage allocation at a particular fulfillment center. The information about the allocated space for a seller at 304 may identify the number of bins of particular sizes or types that are allocated to a user. For example, the information 304 may identify a number of bins of a first size, a number of bins of a second size, and a number of pallets that are associated with the seller for storing inventory offered by the seller. In embodiments, the display 308 may include a representation of the allocated storage space corresponding to 304 and 310 or an actual video or picture of the storage space in the fulfillment center currently selected (in this use case Fulfillment Center D).

Figure 4:
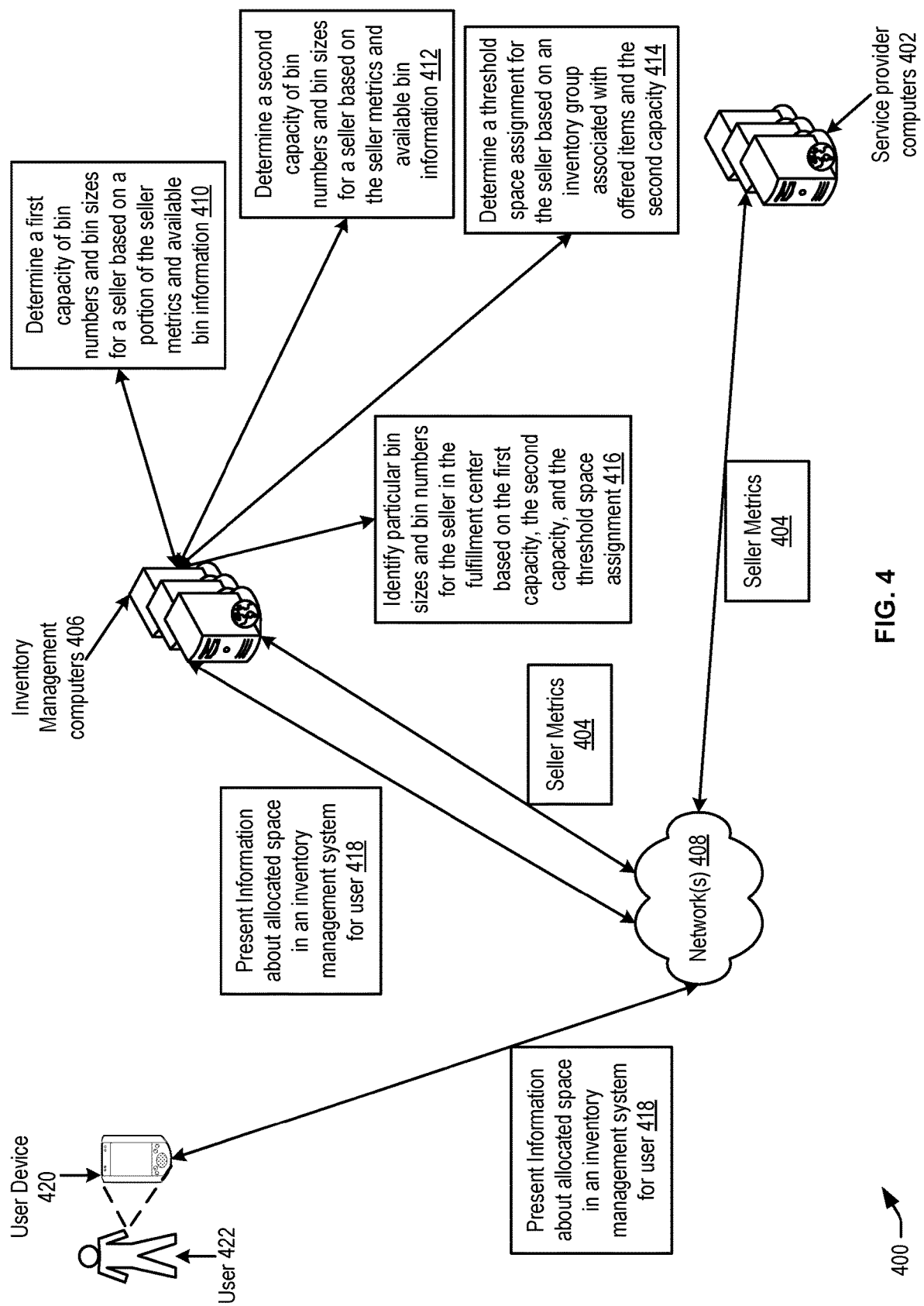
FIG. 4 depicts an example workflow for an allocation feature, in accordance with at least one embodiment.

FIG. 4 depicts an example workflow for an allocation feature, in accordance with at least one embodiment. The workflow 400 of FIG. 4 includes service provider computers 402 providing seller metrics 404 to inventory management computers 406 via networks 408. In response to receiving or obtaining the seller metrics, the inventory management computes 406 may determine a first capacity of bin numbers and bin sizes for a seller based on a portion of the seller metrics and available bin information at 410. In embodiments, the bin numbers and the bin sizes correlate to a number of bins or inventory holders as well as the size and type of the bins that are potentially allocated to a seller. The available bin information may be obtained by the inventory management computers 406 and correlate to bins or inventory holders that are not currently storing inventory for sellers. The workflow 400 includes inventory management computers 406 determining a second capacity of bin numbers and bin sizes for a seller based at least in part on the seller metrics and available bin information at 412.

The workflow 400 depicts the inventory management computers 406 determining a threshold space assignment for the seller based at least in part on an inventory group associated with the offered items and the second capacity at 414. As described herein, the inventory group may be based on the dimensions of the items associated with each seller. The inventory management computers 406 may identify particular bin sizes and bin numbers for the seller in the fulfillment center based at least in part on the first capacity, the second capacity, and the threshold space assignment at 416. In accordance with at least one embodiment, the inventory management computers 406 may transmit, via networks 408, information for presentation about the allocated space in an inventory management system for a user (seller) at 418. The information 418 may be presented via a user device 420 associated with a user 422 (the presentation or interaction of the user 422 with the user device 420 is depicted as the dashed lines between 420 and 422).

Figure 5:
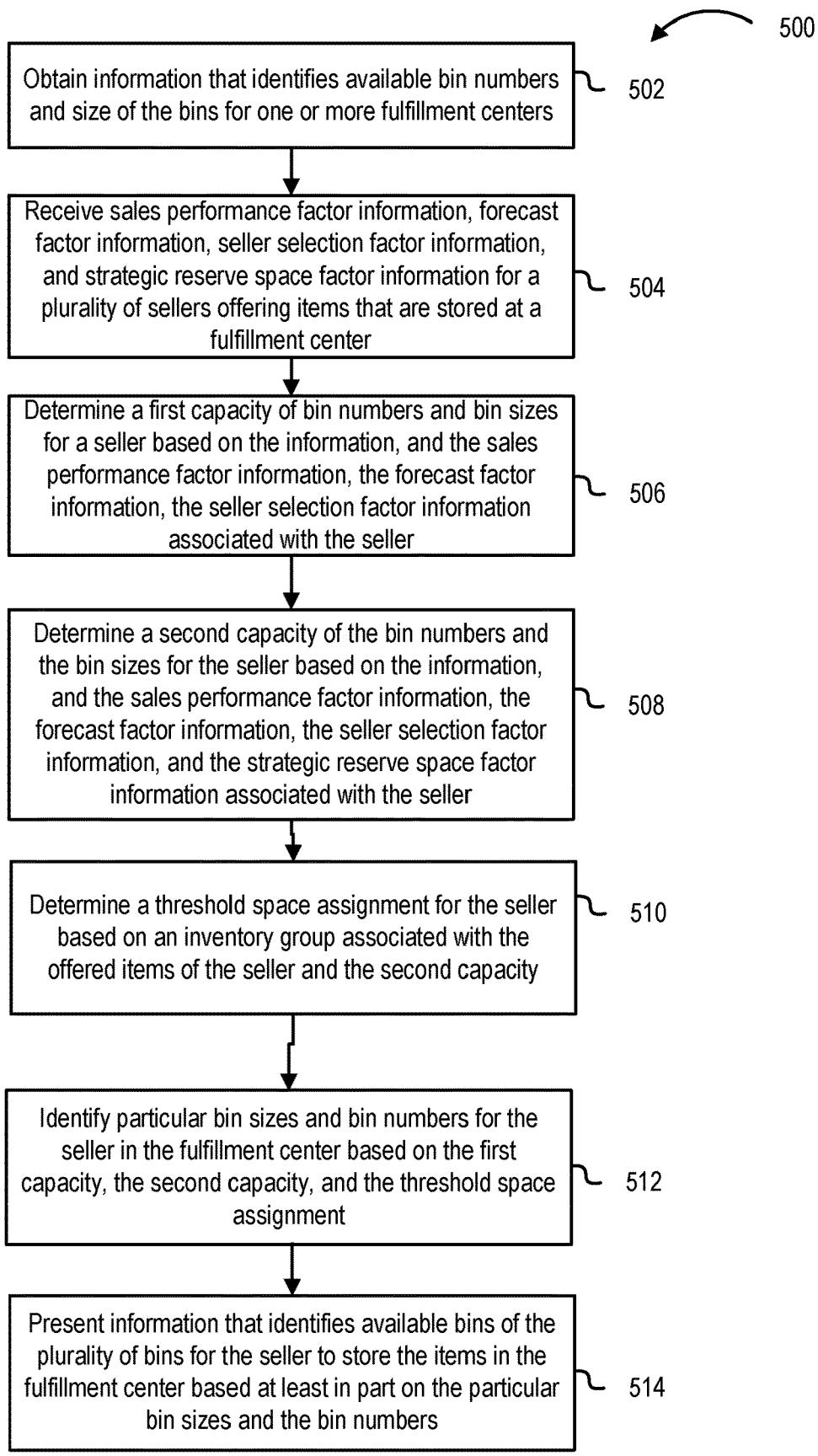
FIG. 5 depicts an example flow diagram for an allocation feature, in accordance with at least one embodiment.
Figure 6:
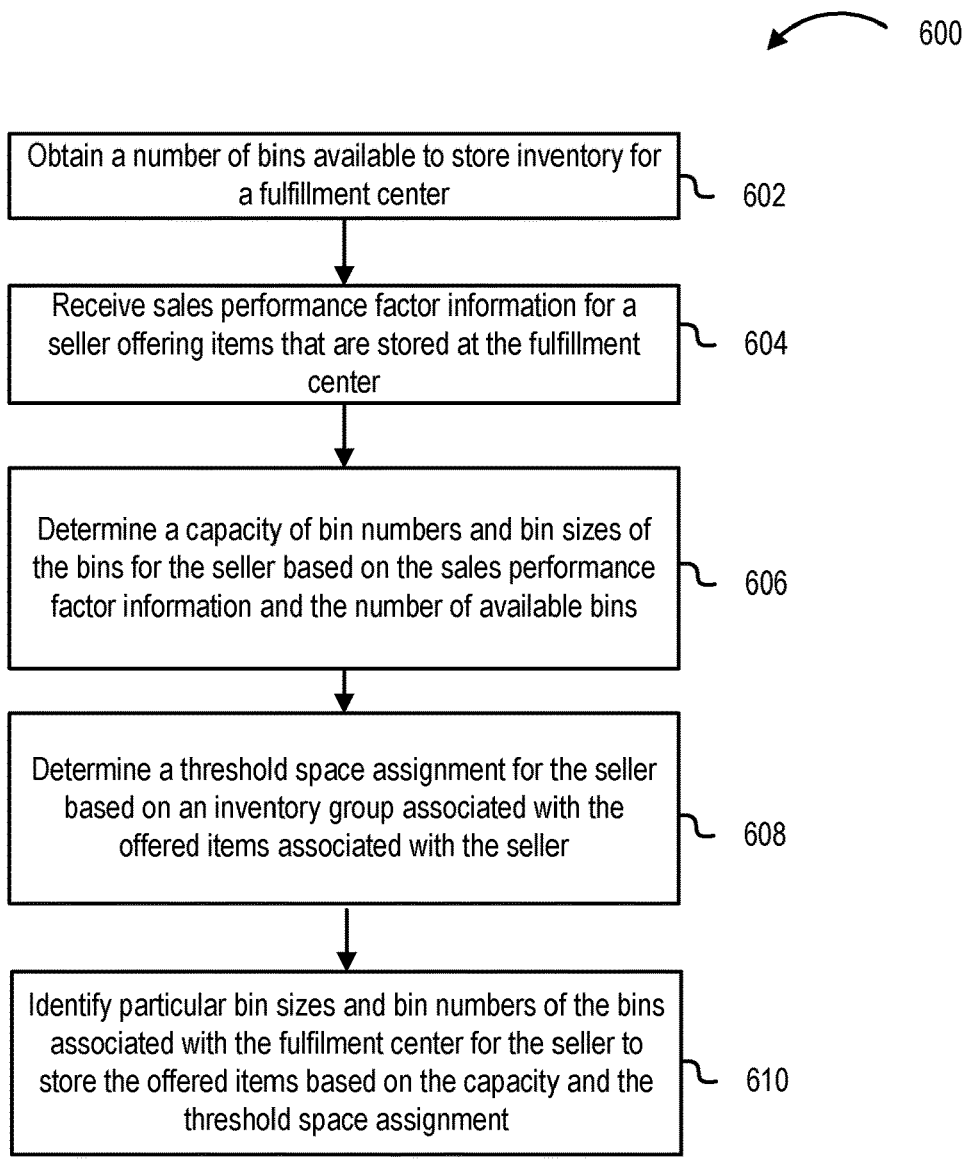
FIG. 6 depicts an example flow diagram for an allocation feature, in accordance with at least one embodiment.

FIGS. 5 and 6 depict example flow charts for allocation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
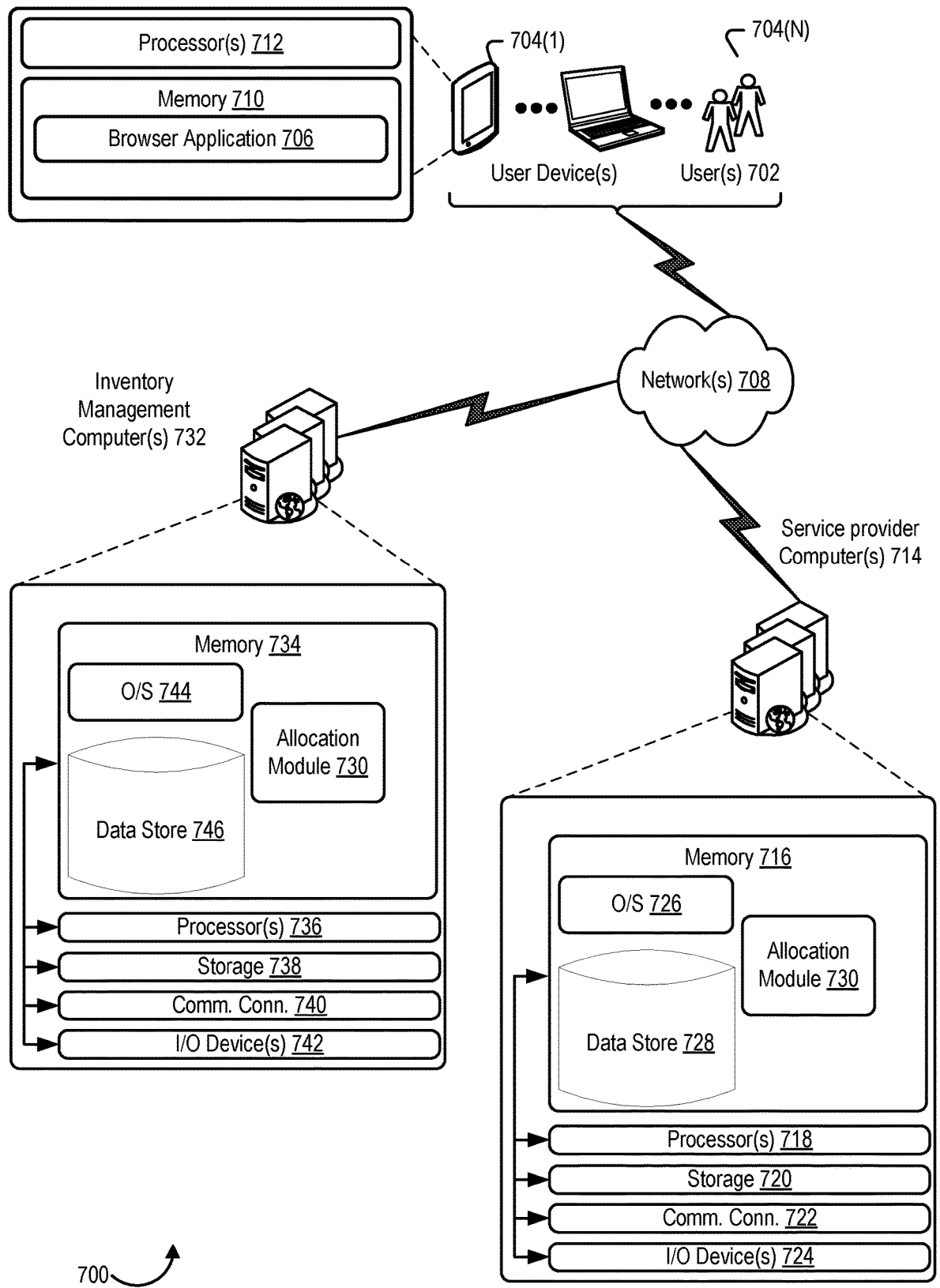
FIG. 7 depicts an example architecture for an allocation feature as described herein that includes one or more service provider computers, inventory management computers, and/or a user device connected via one or more networks, in accordance with at least one embodiment.

In some examples, the user device (420, 702), inventory management computers (inventory management computers 406, 732), or service provider computers (service provider computers 402, 714) utilizing at least the allocation module 730 depicted in FIGS. 4 and 7 may perform the processes 500 and 600 of FIGS. 5 and 6. In FIG. 5, the process 500 may include obtaining information that identifies available bin numbers and size of the bins for one or more fulfillment centers at 502. For example, the available bins may include bins in a fulfillment center that are not currently storing inventory for a seller. Bin numbers may refer to an amount of bins that are not currently storing inventory and bin sizes may refer to a size of each bin of the bins included in a fulfillment center. For example, bin sizes may vary from small, medium, large, to pallet size where each size of a bin may include physical dimensions that are appropriate for storing a number of different dimensioned items such as pens, computers, basketballs, tennis shoes, televisions, etc. The process 500 may include receiving seller metrics for a plurality of sellers offering items that are stored at a fulfillment center at 504. For example, service provider computer associated with an electronic marketplace may maintain and update sales performance factor information, forecast factor information, seller selection factor information, and strategic reserve space factor information for a plurality of sellers offering items via the electronic marketplace. The offered items may be stored in one or more fulfillment centers.

The process 500 may include determining a first capacity of bin numbers and bin sizes for a seller based at least in part on the information, and sales performance factor information, forecast factor information, seller selection factor information associated with a seller of the sellers at 506. The process 500 may include determining a second capacity of the bin numbers and the bin sizes for the seller based at least in part on the information, and the sales performance factor information, the forecast factor information, the seller selection factor information, and the strategic reserve space factor information associated with the seller at 508. The process 500 may include determining a threshold space assignment for the seller based at least in part on an inventory group associated with the offered items of the seller and the second capacity at 510. The process 500 may include identifying particular bin sizes and bin numbers for the seller in the fulfillment center based at least in part on the first capacity, the second capacity, and the threshold space assignment at 512. In embodiments, identification of particular bin sizes and bin numbers includes allocating particular bins of particular sizes to a seller for storing inventory such that inventory from other sellers will not be stored in the particular bins until a subsequent allocation determination is made by the service provider computers or inventory management computers implementing the allocation feature. The process 500 may conclude at 514 by presenting information that identifies available bins of the plurality of bins for the seller to store the items in the fulfillment center based at least in part on the particular bin sizes and the bin numbers. In embodiments, data objects that are presented via a user interface may include information that identifies the particular bin sizes and bin numbers that are allocated to a seller as well as other metrics such as location of the bins at particular fulfillment centers, percentages of total space used by the particular seller at a fulfillment center, and other appropriate information such as the particular seller metrics that were utilized to determine the dynamic allocation of the storage space for the seller.

In embodiments, the algorithm implemented by the service provider computers and/or inventory management computers may utilize information that identifies design space constraints or physical dimension and object restraints of a fulfillment center to determine the particular bin sizes and the bin numbers for a seller at the fulfillment center. This ensures that the algorithm does not attempt to designate or allocate a particular number of bins such that it exceeds the actual physical space supported by a fulfillment center. In accordance with at least one embodiment, the algorithm for the allocation feature described herein may utilize a default sales performance factor for new sellers which do not have data available to generate the sales performance factor information as they may not have sold or completed any orders with which to generate such information. In embodiments, the service provider computers and/or the inventory management computers may instruct movement of particular bins or pallets within a fulfillment center as part of adjusting the allocation of storage space assigned to each seller. For example, instructions may be generated and transmitted to semi-automated or fully automated mobile drive units for moving bins, inventory holders, or pallets within the fulfillment center to implement the dynamic storage allocation described herein. In some embodiments, the mobile drive units may be instructed to not move the bins, inventory holders, or pallets within the fulfillment center but instead to store inventory in particular bins, inventory holders, or pallets that are designated for a particular seller no matter the location of the particular bins, inventory holders, or pallets within the fulfillment center. Examples of such inventory systems that utilize automated or semi-automated mobile drive units to transfer inventory are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS, the entire disclosures of which are herein incorporated by reference. In accordance with at least one embodiment, the algorithm may utilize weighing factors which modify values corresponding to the seller metrics using a linear regression of historical predictions of sales associated with the seller and actual sales associated with the seller of the offered items within a certain time period (e.g., previous eight week time period).

The process 600 may include obtaining a number of bins available to store inventory for a fulfillment center at 602. In embodiments, sensors associated with the bins, inventory holders, or pallets of a fulfillment center may detect whether a given bin, inventory holder, or pallet is currently storing an item. In some embodiments, image detection algorithms or laser impedance sensors may be used to detect which bins, inventory holders, or pallets are currently storing an item. In embodiments, when an item is stored in a bin, inventory holder, or pallet, a signal may be sent to the inventory management computers which indicates storage of an item in the particular bin, inventory holder, or pallet and is stored as a data field or flag in the inventory management computers as unavailable for storing items for a seller. The process 600 may include receiving sales performance factor information for a seller offering items that are stored at the fulfillment center at 604.

The process 600 may include determining a capacity of bin numbers and bin sizes of the bins for the seller based at least in part on the sales performance factor information and the number of available bins at 606. In accordance with at least one embodiment, the sales performance factor information is obtained for each seller for a certain time period, such as the previous day, week, weeks, or months (e.g., previous eight weeks). The process 600 may include determining a threshold space assignment for the seller based at least in part on an inventory group associated with the offered items associated with the seller at 608. The process 600 may include identifying particular bin sizes and bin numbers of the bins associated with the fulfillment center for the seller to store the offered items based at least in part on the capacity and the threshold space assignment at 610. In accordance with at least one embodiment, the allocation feature may include obtaining a regional customer demand distribution factor information for each seller that identifies particular item demand of the offered items for the seller within particular geographical regions. The regional customer demand distribution factor information may be utilized by the service provider computers and/or the inventory management computers for identifying the particular bin sizes and bin numbers for the seller and ensuring that items with a high geographic demand for a particular geographic region are stored at a geographically close fulfillment center for that seller.

In accordance with at least one embodiment, the allocation feature may use information from an inventory management computer regarding the physical dimensions of the available bins, inventory holders, or pallets to determine whether they are configured to store the items offered by each seller and intended for a particular fulfillment center. In embodiments, the allocation feature may identify a nearby (geographically close with regard to geographic distance) fulfillment center to a given fulfillment center that is being analyzed to store inventory offered by a seller. In cases where the allocation space required for a given seller exceeds what is available in a first fulfillment center given the constraints of the space and required minimum space for other sellers, a nearby fulfillment center may be identified and instructions to transfer and store some of the seller's inventory may be transmitted to the inventory management computers. This may reduce the impact between order and successful delivery of the items from the fulfillment centers storing inventory for a seller and the customers ordering the items offered by the seller but stored in different fulfillment centers.

FIG. 7 depicts an example architecture for an allocation feature as described herein that includes one or more service provider computers, inventory management computers, and/or a user device connected via one or more networks, in accordance with at least one embodiment. In architecture 700, one or more users 702 (e.g., customers, users, consumers, sellers, etc.,) may utilize user computing devices 704(1)-(N) (collectively, user devices 704) to access content such as by interacting with a user interface of an application such as a browser application 706 or a user interface (UI) accessible through the browser application 706, via one or more networks 708 to request information that identifies allocated storage space in one or more fulfillment centers for offered items as described herein. In embodiments, the one or more users 702 may utilize user computing devices 704(1)-(N) to access the browser application 706 or a UI accessible through the browser application 706, to request content that identifies the dynamically allocates storage (particular bins and bin sizes) for inventory offered by the user 702 for one or more fulfillment centers. The "browser application" 706 can be any browser control or native application that can access and display a network page or other information such as a user interface of a native software application for enabling the submission of query selections as well as providing information that identifies a demand for more storage allocation for offered inventory. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic marketplace operations, serving content associated with an electronic marketplace, and fulfilling orders made via the electronic marketplace, etc. The service provider computers 714 may implement or be an example of the service provider computer(s) described herein and throughout the disclosure. The one or more service provider computers 714 may also be operable to provide site hosting, media streaming services, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the allocation module 730. In accordance with at least one embodiment, the allocation module 730 may be configured to receive or obtain information that identifies available bins or storage space for one or more fulfillment centers (e.g., bin sizes and bin numbers that are not currently storing inventory), as well as seller metrics such as sales performance factor information, forecast factor information, seller selection factor information, and strategic reserve space factor information for a plurality of sellers offering items via an electronic marketplace that are being stored in a fulfillment center. The allocation module 730 of the service provider computers 714 may be configured to utilize an algorithm that uses the information and the seller metrics to dynamically identify capacities of bin sizes and bin numbers for each fulfillment center and seller to allocate for storing the corresponding inventory (e.g., offered items associated with each seller). The allocation module 730 may be configured to identify space requirements of the fulfillment center as well as demand allocation requests from particular sellers, minimum storage capacity requirements for sellers, and geographical location demands for particular items and the location of fulfillment centers that store the particular items when determining the dynamic allocation of bin sizes and bin numbers for each seller of the plurality of sellers. The service provider computers 714 may receive or request the information that identifies available storage from inventory management computers 732 that are associated with one or more fulfillment centers (not pictured). The allocation module 730 and service provider computers 714 may generate data objects which can present information via a user interface, such as a user interface presented via user device 704, which identifies particular bin sizes and bin numbers that are allocated for a seller of the plurality of seller. As described herein, the allocation module 730 may periodically determine the allocation of storage space for each seller using updated data included in the seller metrics and available information such that underperforming or underutilizing sellers may have less allocated storage space while ensuring that seller's that are fulfilling more orders have more allocated space to allow business growth.

The inventory management computers 732 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the inventory management computers 732 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the inventory management computers 732 may be in communication with the user device 704 and/or the service provider computers 714 via the networks 708, or via other network connections. The inventory management computers 732 may include one or more servers, perhaps arranged in a cluster or as individual servers not associated with one another.

In one illustrative configuration, the inventory management computers 732 may include at least one memory 734 and one or more processing units or processor(s) 736. The processor(s) 736 may be implemented as appropriate in hardware, computer-executable instructions, firmware, or combination thereof. Computer-executable instruction or firmware implementations of the processor(s) 736 may include computer-executable or machine-executable instructions written in any suitable programming language to perform the various functions described when executed by a hardware computing device, such as a processor. The memory 734 may store program instructions that are loadable and executable on the processor(s) 736, as well as data generated during the execution of these programs. Depending on the configuration and type of the inventory management computers 732, the memory 734 may be volatile (such as RAM) and/or non-volatile (such as ROM, flash memory, etc.). The inventory management computers 732 or servers may also include additional storage 738, which may include removable storage and/or non-removable storage. The additional storage 738 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 734 may include multiple different types of memory, such as SRAM, DRAM, or ROM.

The memory 734, the additional storage 738, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 734 and the additional storage 738 are all examples of non-transitory computer storage media. Additional types of non-transitory computer storage media that may be present in the inventory management computers 732 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the inventory management computers 732. Combinations of any of the above should also be included within the scope of non-transitory computer-readable media.

The inventory management computers 732 may also contain communication connection interface(s) 740 that allow the inventory management computers 732 to communicate with a data store, another computing device or server, user terminals, and/or other devices on the networks 708. The inventory management computers 732 may also include I/O device(s) 742, such as a keyboard, a mouse, a pen, a voice input device, a touch input device, a display, speakers, a printer, etc.

Turning to the contents of the memory 734 in more detail, the memory 734 may include an operating system 744, one or more data stores 746, and/or one or more application programs or services for implementing the features disclosed herein including the allocation module 730. In accordance with at least one embodiment, the allocation module 730 may be configured to obtain information that identifies available bins or storage space for one or more fulfillment centers (e.g., bin sizes and bin numbers that are not currently storing inventory), as well as receive seller metrics such as sales performance factor information, forecast factor information, seller selection factor information, and strategic reserve space factor information for a plurality of sellers offering items via an electronic marketplace that are being stored in a fulfillment center. The allocation module 730 of the inventory management computers 732 may be configured to utilize an algorithm that uses the information and the seller metrics to dynamically identify capacities of bin sizes and bin numbers for each fulfillment center and seller to allocate for storing the corresponding inventory (e.g., offered items associated with each seller). The allocation module 730 may be configured to identify space requirements of the fulfillment center as well as demand allocation requests from particular sellers, minimum storage capacity requirements for sellers, and geographical location demands for particular items and the location of fulfillment centers that store the particular items when determining the dynamic allocation of bin sizes and bin numbers for each seller of the plurality of sellers. The inventory management computers 732 may receive or request the seller metrics from the service provider computers 714 that are associated with an electronic marketplace (not pictured). The allocation module 730 and inventory management computers 732 may generate data objects which can present information via a user interface, such as a user interface presented via user device 704, which identifies particular bin sizes and bin numbers that are allocated for a seller of the plurality of seller. As described herein, the allocation module 730 may periodically determine the allocation of storage space for each seller using updated data included in the seller metrics and available information such that underperforming or underutilizing sellers may have less allocated storage space while ensuring that seller's that are fulfilling more orders have more allocated space to allow business growth.

Figure 8:
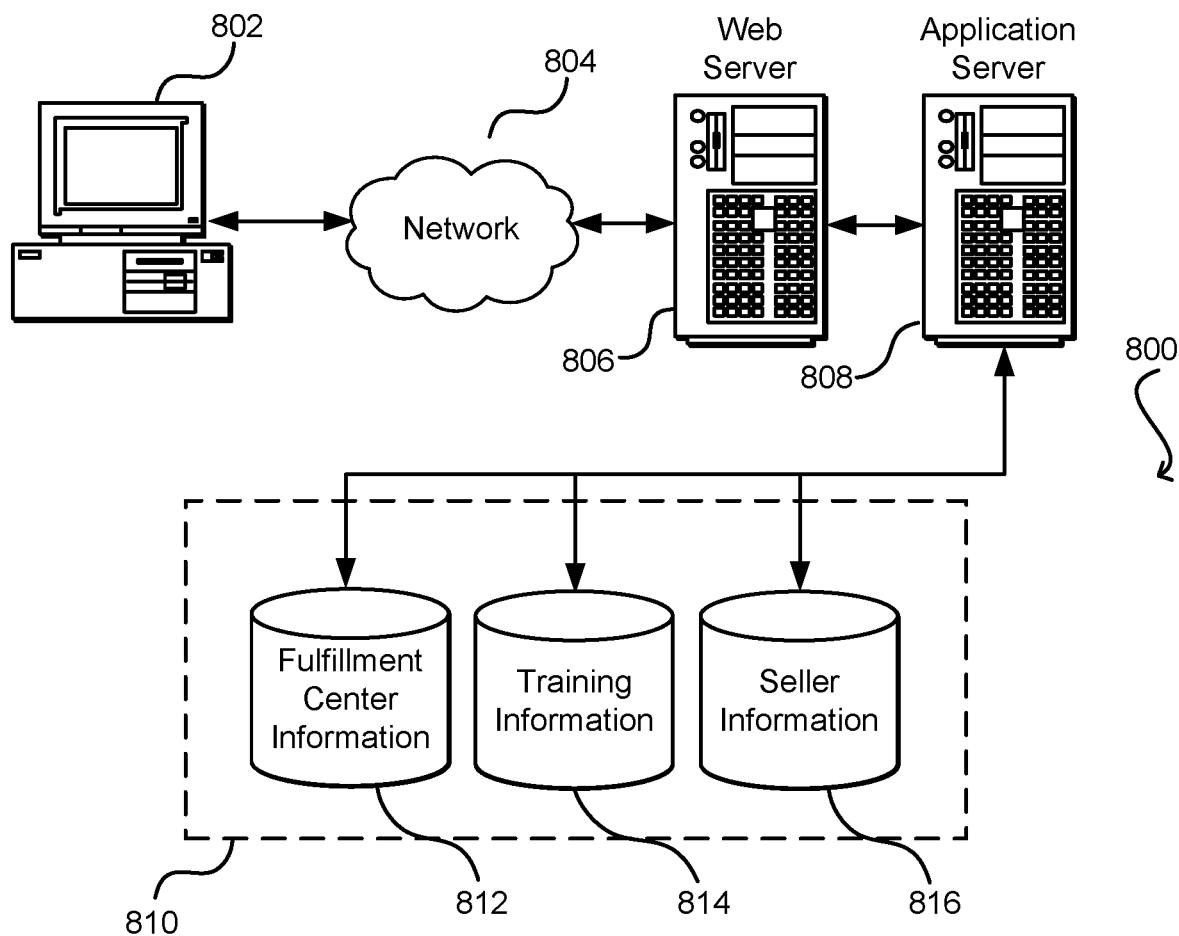
FIG. 8 illustrates an example environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing fulfillment center 812 and seller information 816, which can be used to serve content for the production side as well as identify bin sizes and bin numbers that are available to store inventory in one or more fulfillment centers, and identify metrics associated with sellers such as sales performance factor information, forecast factor information, seller selection factor information, and strategic reserve space factor information. The data store also is shown to include a mechanism for storing training information 814, which can be used for reporting, analysis or other such purposes. For example, the training information 814 can be used to train one or more machine learning algorithms that are utilized to dynamically determine various seller metrics such as the sales performance factor information or weight certain data points included in the seller metrics using historical data analysis of previous seller activity (e.g., units sold or offered, actual space utilized in a fulfillment center by inventory, location of fulfillment center to geographic demand for offered items, etc.). It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computer system, item storage bin number information and item storage bin size information for a plurality of item storage bins not storing inventory, the plurality of item storage bins associated with one or more fulfillment centers;
    receiving, by the computer system and from a server computer associated with an electronic platform, sales performance factor information, forecast factor information, seller selection factor information, and strategic reserve space factor information for a plurality of sellers offering items via the electronic platform that are stored in a fulfillment center of the one or more fulfillment centers, the sales performance factor information including item sales velocity for the items made by each seller of the plurality of sellers;
    determining, by the computer system, a first capacity of item storage bin numbers and item storage bin sizes of the plurality of item storage bins for a seller of the plurality of sellers based at least in part on the sales performance factor information, the forecast factor information, the seller selection factor information associated with the seller, and the bin number information and the bin size information;
    determining, by the computer system, a second capacity of the item storage bin numbers and the item storage bin sizes for the seller based at least in part on the item storage bin number information and the item storage bin size information, and the sales performance factor information, the forecast factor information, the seller selection factor information, and the strategic reserve space factor information associated with the seller;
    determining, by the computer system, a threshold space assignment for the seller based at least in part on an inventory group associated with the offered items associated with the seller and the second capacity, the inventory group assigned by an administrator of the electronic platform;
    identifying, by the computer system, particular item storage bin sizes and item storage bin numbers for the seller in the fulfillment center based at least in part on the first capacity, the second capacity, and the threshold space assignment;
    instructing, by the computer system, storage of the items associated with the seller in the fulfillment center using the particular item storage bin sizes and the item storage bin numbers; and
    instructing, by the computer system, an automated mobile drive unit of the fulfillment center to move particular bins of the item storage bins from a first area of the fulfillment center to a second area of the fulfillment center to optimize storage capacity in the fulfillment center for the seller, the particular bins corresponding to the particular item storage bin sizes and the item storage bin numbers.

2. The computer-implemented method of claim 1, wherein the sales performance factor information includes sales performance by the seller for the offered items during a certain time period and seasonality information for an item of the offered items in a geographic region associated with the fulfilment center.

3. The computer-implemented method of claim 1, wherein the forecast factor information identifies a demand projection factor that is determined based at least in part on a projected demand for an item of the offered items based on global sales for the item.

4. The computer-implemented method of claim 1, wherein the seller selection factor information includes a specified bin number and bin size of the plurality of bins that are allocated to each seller of the sellers based on an item type associated with the offered items and a number of the offered items associated with the seller.

5. The computer-implemented method of claim 1, wherein the strategic reserve space factor information identifies additional bin number and bin sizes of the plurality of bins associated with each seller of the sellers based at least in part on a promotion event associated with each seller.

6. A system comprising:
a processor; and
a memory including instructions that, when executed with the processor, cause the system to, at least:
obtain a number of bins available to store inventory, the bins associated with a fulfillment center;
receive sales performance factor information for a seller offering items via an electronic platform, the items being stored at the fulfillment center, the sales performance factor information including item sales velocity for the offered items by the seller;
determine a capacity of bin numbers and bin sizes of the bins for the seller based at least in part on the sales performance factor information and the number of bins;
determine a threshold space assignment for the seller based at least in part on an inventory group associated with the offered items associated with the seller, the inventory group assigned by an administrator of the electronic platform;
identify particular bin sizes and bin numbers of the bins associated with the fulfillment center for the seller to store the offered items based at least in part on the capacity and the threshold space assignment;
instruct storage of the offered items associated with the seller in the fulfillment center using the bins corresponding to the particular bin sizes and the bin numbers; and
instruct an automated mobile drive unit of the fulfillment center to move particular bins of the bins from a first area of the fulfillment center to a second area of the fulfillment center to optimize storage capacity in the fulfillment center for the seller, the particular bins corresponding to the particular bin sizes and the bin numbers.

7. The system of claim 6, wherein the instructions when executed with the processor further cause the system to at least present, via a user interface of a computer device, information that identifies the particular bin sizes and the bin numbers of the bins associated with the fulfillment center for the seller to store the offered items in response to a query, via the user interface, from the seller.

8. The system of claim 6, wherein identifying the particular bin sizes and the bin numbers is further based at least in part on information that identifies design space constraints for the fulfillment center.

9. The system of claim 6, wherein the sales performance factor information identifies previous sales or offers associated with the seller within a certain time period.

10. The system of claim 6, wherein the inventory group is determined based at least in part on a size of the bin or a pallet and a product dimensions associated with each item of the offered items, wherein the size of the bin is configured to store an item of the offered items with physical dimensions corresponding to the physical dimensions of the bin.

11. The system of claim 6, wherein the sales performance factor is a default value specified by an administrator of the fulfillment center for a new seller that has not previously offered items.

12. The system of claim 6, wherein the sales performance factor information is adjusted based on a weighing factor that is associated with a linear regression of historical predictions of sales associated with the seller and actual sales associated with the seller of the offered items.

13. A non-transitory computer readable medium storing specific computer-executable instructions that, when executed by a processor, cause a computer system to at least:
receive, from an inventory storage management computer associated with a fulfilment center, information that identifies a number of bins available to store inventory, the bins associated with the fulfillment center;
obtain sales performance factor information for a seller offering items, the items being stored at the fulfillment center, the sales performance factor information including sales velocity for the offered items by the seller;
determine a capacity of bin numbers and bin sizes of the bins for the seller based at least in part on the sales performance factor information and the information that identifies the number of bins;
determine a threshold space assignment for the seller based at least in part on an inventory group associated with the offered items associated with the seller, the inventory group assigned by an administrator of an electronic platform;
identify particular bin sizes and bin numbers of the bins associated with the fulfillment center for the seller to store the offered items based at least in part on the capacity and the threshold space assignment;
instruct storage of the offered items associated with the seller in the fulfillment center using the bins corresponding to the particular bin sizes and the bin numbers; and
instruct an automated mobile drive unit of the fulfillment center to move particular bins of the bins from a first area of the fulfillment center to a second area of the fulfillment center to optimize storage capacity in the fulfillment center for the seller, the particular bins corresponding to the particular bin sizes and the bin numbers.

14. The non-transitory computer readable medium of claim 13, wherein the computer-executable instructions when executed by the processor further cause the computer system to obtain a regional customer demand distribution factor information that identifies particular item demand of the offered items that are associated with particular geographical regions.

15. The non-transitory computer readable medium of claim 14, wherein determining the threshold space assignment for the seller is further based at least in part on the regional customer demand distribution factor information.

16. The non-transitory computer readable medium of claim 13, wherein the computer-executable instructions when executed by the processor further cause the computer system to determine that the number of bins available to store the inventory include certain size bins corresponding to physical dimensions of the offered items of the seller.

17. The non-transitory computer readable medium of claim 13, wherein the computer-executable instructions when executed by the processor further cause the computer system to identify another fulfillment center within a certain geographical distance of the fulfillment center based at least in part on the threshold space assignment for the seller exceeding a certain number of the bins associated with the fulfillment center.

18. The non-transitory computer readable medium of claim 17, wherein the computer-executable instructions when executed by the processor further cause the computer system to instruct transfer of a portion of the offered items for storage at the another fulfillment center.

19. The non-transitory computer readable medium of claim 13, wherein the identification of the particular bin sizes and the bin numbers is performed periodically for the seller.

\* \* \* \* \*